_United States Patent_ [19]

Masuda et al.

[11] Patent Number: 5,323,514
[45] Date of Patent: Jun. 28, 1994

[54] CORD STOPPER

[75] Inventors: Ryuichi Masuda, Kadoma; Hideki Shimizu, Toyonaka, both of Japan

[73] Assignee: Yoshida Kogyo K. K., Tokyo, Japan

[21] Appl. No.: 56,468

[22] Filed: May 5, 1993

[30] Foreign Application Priority Data

May 20, 1992 [JP] Japan ................ 4-040638[U]

[51] Int. Cl.⁵ .................................. F16G 11/00
[52] U.S. Cl. ........................ 24/115 G; 24/136 L
[58] Field of Search ........... 24/115 G, 115 M, 115 F, 24/136 A, 136 L; 403/146

[56] References Cited

U.S. PATENT DOCUMENTS

| 3,080,867 | 3/1963 | Eichinger | 24/115 G |
| 3,806,860 | 4/1974 | Flammini . | |
| 4,453,292 | 6/1984 | Bakker | 24/115 G |
| 4,622,723 | 11/1986 | Krauss | 24/115 G |
| 4,794,673 | 1/1989 | Yamaguchi | 24/115 G |
| 4,839,946 | 6/1989 | Murai | 24/115 G |
| 5,197,166 | 3/1993 | Meier et al. | 24/115 G |

FOREIGN PATENT DOCUMENTS

| 1119940 | 12/1961 | Fed. Rep. of Germany . | |
| 3535623 | 4/1987 | Fed. Rep. of Germany ... | 24/115 G |
| 54-11210 | 5/1979 | Japan . | |
| 59-78475 | 5/1984 | Japan . | |

*Primary Examiner*—Victor N. Sakran
*Attorney, Agent, or Firm*—Hill, Steadman & Simpson

[57] ABSTRACT

A cord stopper is used for releasably fastening a cord thereto. The cord stopper has a housing having a longitudinal cavity extending longitudinally therein and a pair of through apertures formed transversely through the peripheral wall at opposed positions. An insert member is fitted in the cavity so as to be reciprocally movable along the cavity and having a through hole transversely therethrough. A biasing member is provided for normally urging the insert member outward of the cavity so that when the insert member is thrust into the cavity against the bias of the biasing member, the through hole comes substantially into alignment with the through apertures for insertion of the cord therethrough. The cord stopper further includes means for temporally locking the insert member to the housing with the through hole of the insert member substantially aligned with the through apertures of the housing for facilitating a cord-threading operation.

3 Claims, 5 Drawing Sheets

CORD STOPPER

BACKGROUND OF THE INVENTION

1. Field of the Invention:

The present invention relates to a cord stopper for releasably fastening a cord thereto and adjusting the length of the cord, the cord being used on clothes, baggages and so on.

2. Description of the Prior Art:

A typical cord stopper of the type described is disclosed in Japanese Utility Model Publication No. 54-11210 or Japanese Laid-open Patent Publication No. 59-78475. The disclosed cord stopper comprises a housing having a blind bore, an insert member reciprocally mounted in the blind bore and a compression coil spring disposed in the bottom of the blind bore and acting between the housing and the insert member for normally urging the insert member outward. The housing has a pair of diametrically-opposed through apertures formed transversely through the peripheral wall thereof, and the insert member has a through hole formed transversely therethrough. By inserting the insert member into the cavity against the bias of the compression coil spring, the through hole of the insert member is able to come into alignment with the apertures of the housing for insertion of a cord therethrough.

In use, the insert member is thrust into the cavity against the bias of the compression coil spring until the through hole of the insert member comes into alignment with the apertures of the housing. While holding the insert member and the housing in this disposition by his fingers, a user threads a cord through the through hole and the apertures of the insert member and the housing, respectively. As soon as the fingers are released from the cord stopper, the insert member moves outward of the housing under the bias of the compression coil spring, thereby bringing the through hole of the insert member and apertures of the housing out of alignment, so that the cord is caught or fastened by the unaligned through hole and apertures. Consequently, the cord is releasably fastened to the cord stopper.

All that is necessary to release the cord from the cord stopper is to compress the insert member and the housing between fingers against the bias of compression coil spring until the through hole and the apertures are coaligned and then remove the cord through the through hole and the aperture while they are coaligned.

However, the conventional cord stopper suffered from a drawback in that threading the cord through the cord stopper while holding the insert member and the housing with their through hole and the through apertures coaligned by fingers is a very tedious operation, especially if the bias of the coil spring is very strong. If the bias of the spring is reduced to a certain extent, then the threading operation becomes much easier, but the essential function of the cord stopper of fastening the cord thereto becomes much decreased. On the other hand, if the bias of the spring is increased to a certain extent, then the cord stopper can accomplish a satisfactory fastening function but the cord-threading operation becomes much more difficult.

SUMMARY OF THE INVENTION

With the foregoing difficulties in view, it is therefore an object of the present invention to provide a cord stopper which is easy to thread a cord therethrough and at the same time which accomplishes a satisfactory function of fastening the cord thereto for a prolonged period of time.

According to the present invention, there is provided a cord stopper for releasably fastening a cord thereto, the cord stopper comprising: a housing having a longitudinal cavity extending longitudinally therein and a pair of through apertures formed transversely through the peripheral wall at the opposed positions; an insert member fitted in the cavity so as to be reciprocally movable along the cavity and having a through hole transversely therethrough; biasing means for normally urging the insert member outward of the cavity; when the insert member is thrust into the cavity against the bias of the biasing means, the through hole coming substantially into alignment with the through apertures for insertion of the cord therethrough; and means for temporally locking the insert member to the housing with the through hole of the insert member substantially aligned with the through apertures of the housing.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PRESENTLY PREFERRED EMBODIMENTS

Figure 1:
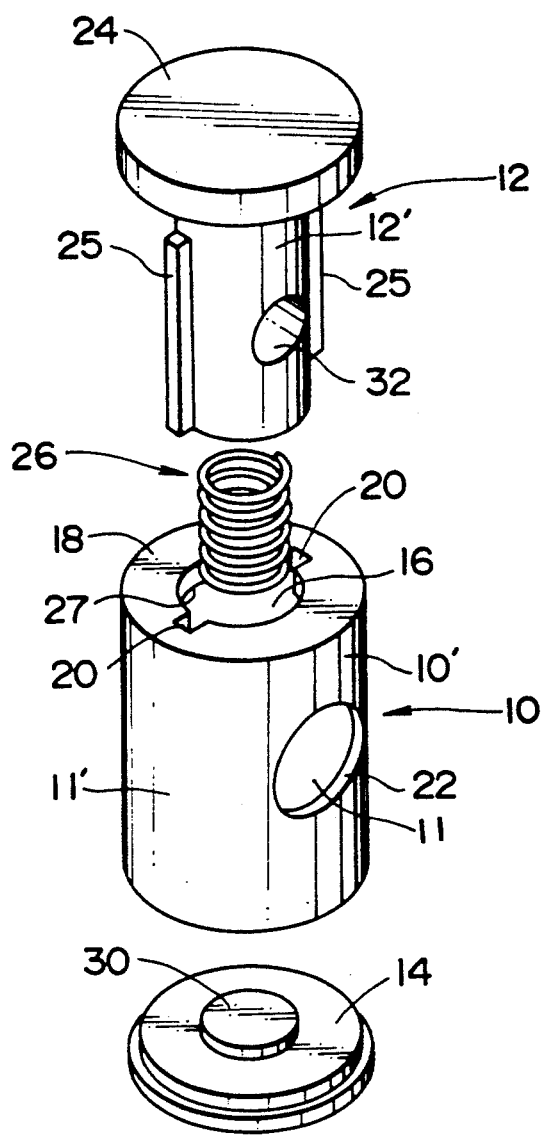
FIG. 1 is an enlarged, perspective and exploded view of a cord stopper according to a first embodiment of the present invention.

FIGS. 1 through 5 show a cord stopper according to a first embodiment of the present invention. As better shown in FIG. 1, the cord stopper broadly comprises a housing 10, an insert member 12 and a biasing element, such as for example, a compression coil spring 26. The housing 10 and the insert member 12 may be made of plastics.

As shown in FIGS. 1 through 5, the housing 10 is a hollow cylinder and generally comprises a cylindrical housing body 10' and a circular bottom lid 14 fastened to the bottom of the cylindrical housing body 10' to thus define with the housing body 10' a longitudinal cavity 11 extending longitudinally therein. The housing body 10' has on the upper end a circular upper end plate 18 which, in turn, has a circular orifice 16 formed coaxially therein so as to communicate with the longitudinal cavity 11. The circular orifice 16 has a pair of diametrically-opposed rectangular cutouts 20, 20 formed on the periphery thereof. The housing body 10' has a pair of elliptical through apertures 22 formed transversely through the peripheral wall 11' at substantially diametrically-opposed positions.

As better shown in FIG. 1, the circular bottom lid 14 has a circular platform 30 formed coaxially on the inner side thereof.

Figure 2:
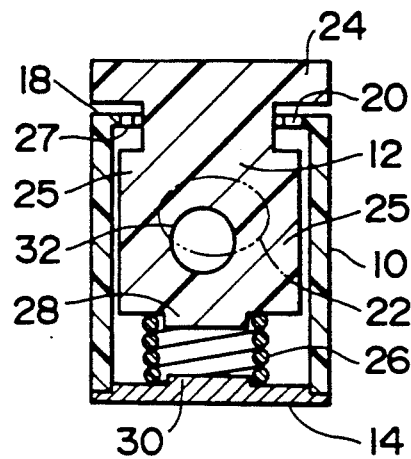
FIGS. 2 through 4 are cross-sectional views of the cord stopper of FIG. 1 and shows sequential steps of threading operation of a cord through the cord stopper.
Figure 3:
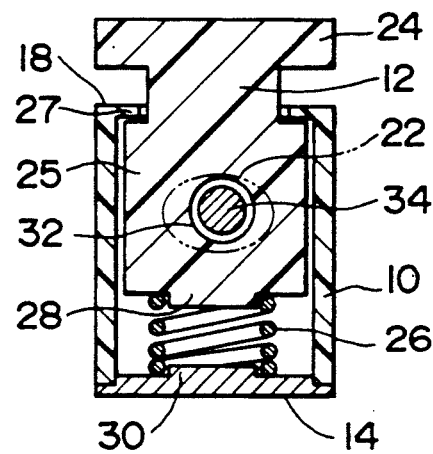
Figure 4:
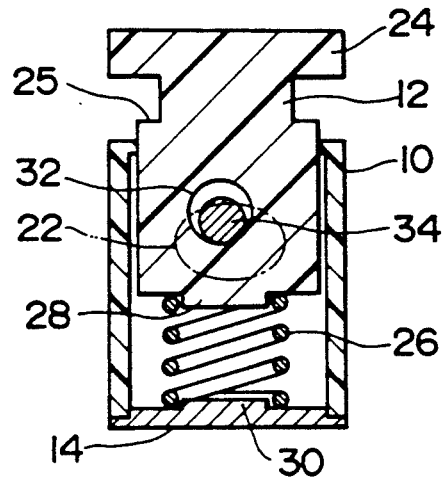
Figure 5:
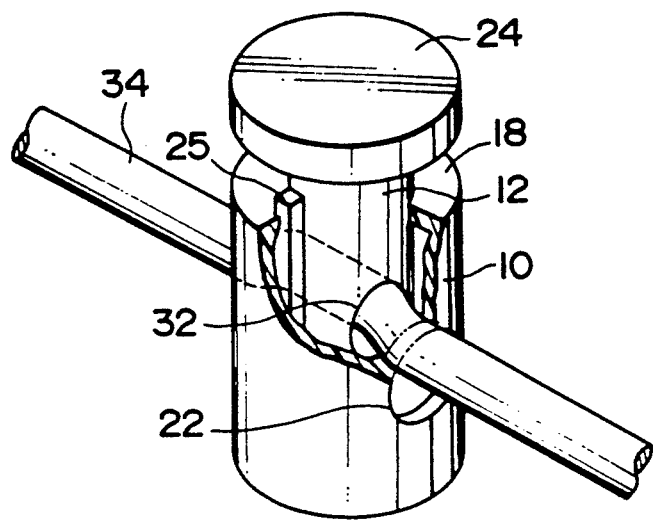
FIG. 5 is a partly cut-out perspective view of the cord stopper and shows the cord threaded through the cord stopper.

As best shown in FIG. 1, the insert member 12 generally comprises a cylindrical insert body 12' and a circular head 24 formed integrally on and mounded coaxially on the cylindrical insert body 12'. The cylindrical insert body 12' is slightly less in diameter than the circular orifice 16, while the circular head 24 is substantially equal in diameter to the cylindrical housing body 10'. The insert body 12' has a pair of elongated ridges 25, 25 provided axially on the peripheral wall thereof at diametrically-opposed positions. Each of the elongated ridges 25, 25 has a uniform rectangular cross-section throughout its length and is able to fit through the respective cutout 20, 20. The distance between the upper end of each elongated ridge 25 and the lower surface 27 of the circular head 24 is slightly greater than the thickness of the upper end plate 18. The insert body 12' has a through hole 32 formed transversely thereof and substantially normal to the diameter extending between the opposed ridges 25, 25. As shown in FIGS. 2 through 4, the insert body 12' further has a circular platform 28 integrally and coaxially formed on the lower surface thereof.

The insert member 12 is inserted through the orifice 16 into the cavity 11 of the housing 10 with the compression coil spring 26 interposed between the lower surface of the insert body 12' and the bottom lid 14 of the housing 10. One end of the compression coil spring 26 is fastened to the circular platform 28 of the insert member 12 and the other end to the circular platform 39 of the housing 10.

When the insert member 12 is thrust into the cavity 11 against the bias of the compression coil spring 26, the through hole 32 of the inlet member 12 is able to come substantially into alignment with the through apertures 22 of the housing 10 for insertion of the cord 34 therethrough.

In use, the insert member 12 is first thrust through the orifice 16 into the longitudinal cavity 11 against the bias of the compression coil spring 26 with the elongated ridges 25, 25 fitted through the cutouts 20, 20 until the hole 32 comes down beyond the level of the apertures 22, as shown in FIG. 2. In this instance, the upper ends of the elongated ridges 25 descend beyond the lower surface 27 of the upper end plate 18 of the cylindrical housing 10 and the through hole 32 is slightly unaligned angularly with the apertures 22 of the cylindrical housing 10. The insert member 12 is then rotated slightly to bring the elongated ridges 25 out of registry with the cutouts 20. Release of the fingers from the cord stopper causes the insert member 12 urge upward under the bias of the compression coil spring 26, bringing the elongated ridges 25 into locking engagement with the lower surface 27 of the upper end plate 18 of the cylindrical housing 10, so that the insert member 12 is temporarily locked to the housing 10, as shown in FIG. 3. In this instance, the through hole 32 of the insert member 12 is substantially in alignment with the through apertures 22 of the housing 10.

The cord 34 is then threaded and adjusted in length through the coaligned through hole 32 and the apertures 22. Thereafter, the insert member 12 is rotated slightly in a reverse direction in the housing 10 with the elongated ridges 25 of the former into registry with the cutouts 20 of the latter. Release of the finger from the cord stopper causes the insert member 12 urged upward under the bias of the compression coil spring 26 with the elongated ridges 25 fitted in the cutouts 20 so that the cord 34 is caught or fastened by the edges of the unaligned hole 32 and the apertures 22, as shown in FIG. 4.

In this embodiment, since the engagement of the ridge 25 and the upper end plate 18 can temporarily retain the insert member 12 to the cylindrical housing 10 against the bias of the compression spring 26 with the hole 32 and the apertures 22 coaligned, the user need not hold the insert member 12 and the cylindrical housing 10 against the bias of the compression coil spring 26 in this disposition during threading of the cord 34 through the hole 32 and the apertures 22. This means that the cord stopper can incorporate a compression coil spring of a stronger bias such that the cord stopper is easy to thread the cord 34 therethrough and at the same time, once having the cord 34 threaded therethrough, is reliable and stable in fastening the cord 34.

Figure 6:
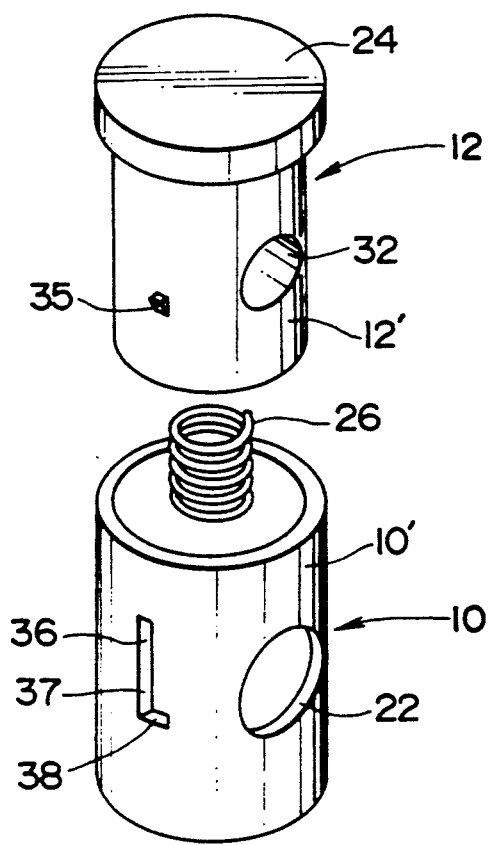
FIG. 6 is an enlarged, perspective and exploded view of a cord stopper according to a second embodiment.
Figure 7:
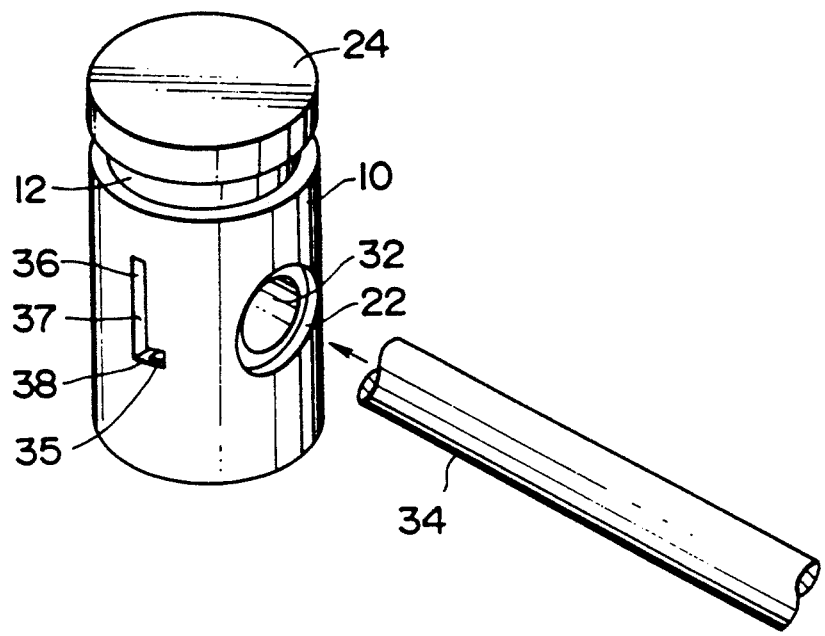
FIG. 7 is an enlarged perspective view of the cord stopper of FIG. 6, showing an insert member temporarily locked to a housing for threading of the cord therethrough.
Figure 8:
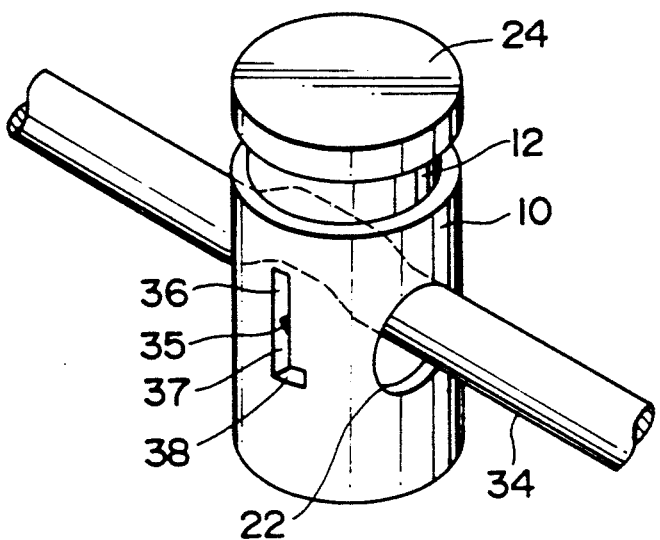
FIG. 8 is a view similar to FIG. 7 but showing the insert member to come out of temporary locking engagement with the housing.

Turning now to the second embodiment shown in FIGS. 6 through 8, a cord stopper according to the second embodiment is substantially identical with the cord stopper according to the preceding embodiment, and so, the same reference numerals are used to refer to the same parts in the drawings.

Instead of the pair of elongated ridges 25, 25, the insert body 12' has a locking prong 35 formed protuberantly on the peripheral surface a little lower than halfway between the upper and lower end of the insert body 12'. The cylindrical housing 10 has an L-shaped through slit 36 formed through the peripheral wall 10'. The L-shaped through slit 36 is of such a width as to loosely receive the protuberant locking prong 35. The L-shaped through slit 36 comprises a longer vertical slit part 37 extending longitudinally of the housing 10 and a shorter horizontal slit part 38 joined normally thereto. The insert member 12 is thrust into the housing 10 with the protuberant locking prong 35 guided along the vertical slit part 37 and the insert member 12 is rotated in the housing 10 with the protuberant locking prong 35 guided along the horizontal slit part 38. The position and the length of the L-shaped through slit 36 are such that, when the protuberant locking prong 35 reaches the horizontal slit part 38, the through hole 32 reaches the level of the through apertures 22 of the housing 10; and, when the protuberant locking prong 35 reaches the distal end of the horizontal slit part 38, the through hole 32 comes into alignment with the through apertures 22. Although the slit 36 is L-shaped in this embodiment, the slit 36 may be J-shaped, inverted-T-shaped, or shaped in any other suitable shape as having a portion which functions to retain the insert member 12 to the housing 10 against the bias of the compression coil spring 26.

In using the cord stopper according to the second embodiment, the insert member 12 is thrust into the longitudinal cavity 11 of the housing 10 against the bias of the compression coil spring 26 with the locking prong 35 guided along the vertical slit part 37 of the L-shaped through slit 36 until the locking prong 35 reaches the horizontal slit part 38. Then, the insert member 12 is slightly rotated in the cylindrical housing 10 with the locking prong 35 guided along the horizontal slit 38 of the L-shaped through slit 36 until the locking prong 35 reaches the distal end of the horizontal slit part 38, so that the insert member 12 is locked to the housing 10 whereupon the through hole 32 of the insert member 12 and the apertures 22 of the housing 10 come into alignment with each other, as shown in FIG. 7. Then, the cord 34 is threaded through the coaligned hole 32 and the apertures 22. Thereafter, the insert member 12 is rotated in a reverse direction until the locking prong 35 reaches the vertical slit part 37, at which moment the insert member 12 is urged upward under the bias of the compression coil spring 26, so that the cord 34 is caught or fastened by the edges of the unaligned hole 32 and the apertures 22, as shown in FIG. 8.

In addition to the advantages enjoyed by the first embodiment, the cord stopper according to the second embodiment enjoys another advantage that, since the protuberant locking prong 35 is guided by the L-shaped through slit 36, the locking operation of the insert member 12 to the housing 10 can be carried out smoothly.

Figure 9:
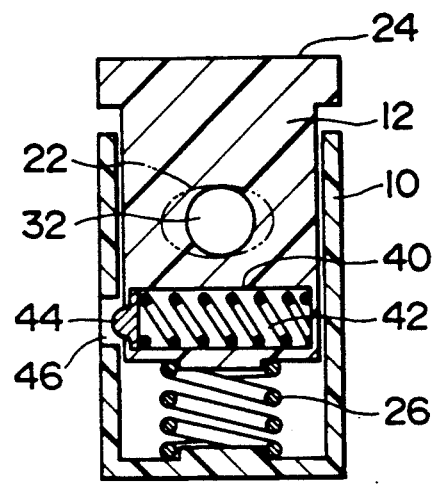
FIG. 9 is a longitudinal cross-sectional view of a cord stopper according to a third embodiment of the present invention.

Turning now to a third embodiment according to the present invention illustrated in FIG. 9, the cord stopper is substantially identical with that according to the second embodiment except that the L-shaped slit 36 and the locking prong 35 are replaced with a through locking hole 46 and a spring-biased protuberant lug 44. To be specific, the insert member 12 has a blind bore 40 formed transversely therein below the through aperture 32. Another bias means such as a compression coil spring 42 is fitted in the blind bore 40 with one end resting on the bottom of the blind bore 40. The protuberant lug 44 is fastened to the other end of the compression coil spring 42 and is normally urged under the bias of the compression coil spring 42 against the inner periphery of the cavity 11. The housing 10 has the locking hole 46 formed in the periphery 10' thereof. The positions of the blind bore 40 and the locking hole 46 are such that, when the protuberant lug 44 comes into engagement with the locking hole 46, the through hole 32 comes substantially into alignment with the through apertures 22.

In use of the cord stopper, the insert member 12 is thrust into the cavity 11 of the housing 10 against the bias of the compression coil spring 26 with the protuberant lug 44 biased against the inner periphery of the cavity 11 under the bias of the compression coil spring 42, until the protuberant lug 44 comes into engagement with the locking hole 46 under the bias of the compression coil spring 42 so that the insert member 12 is locked to the housing 10, whereupon the through hole 32 comes substantially into alignment with the through apertures 22. Then, the cord 34 is threaded through the thus coaligned hole 32 and the apertures 22. Thereafter, pushing the protuberant lug 44 inward by a finger nail or a tip of a pointed article against the bias of the compression coil spring 42 brings the lug 44 out of engagement with the locking hole 46, whereupon the insert member 12 is urged upward under the bias of the compression coil spring 26, so that the cord 34 is caught or fastened by the edges of the thus unaligned hole 32 and the apertures 22.

Figure 10:
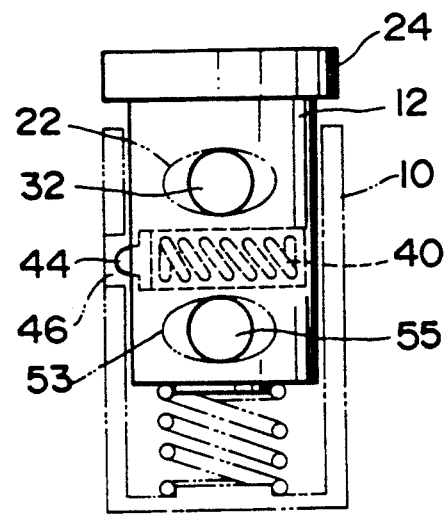
FIG. 10 is a front view of an insert member of a cord stopper according to a fourth embodiment of the present invention.

FIG. 10 shows a fourth embodiment of the present invention. A cord stopper according to the fourth embodiment is substantially identical with that of the third embodiment shown in FIG. 9, except that the housing 10 has two pairs of opposed apertures 22, 53 which are formed transversely therethrough with the hole 46 interposed between the pairs of apertures 22, 53 and that, correspondingly, the insert member 12 has two through holes 32, 55 formed transversely therethrough with the blind bore 40 interposed between the holes 32, 55. Each through hole 32, 55 is spaced from the other hole 55, 32 substantially as much as each opposed pair of apertures 22, 53 is spaced from the other opposed pair of apertures 53, 22. The construction of providing the housing 10 with two pairs of opposed apertures 22, 53 and the insert member 12 with two corresponding through holes 32, 55 is applicable to the first and second embodiments as well.

The cord 34 is first threaded through the apertures 53 and the hole 55, is then bent back and is threaded through the apertures 22 and the hole 32. The rest of the operation is the same as that according to the third embodiment.

The cord stopper according to the present invention is applicable for various cords which are used on baggages, sacks, shoes, tents and so forth.

With the construction set forth hereinabove, in the cord stopper, the user need not hold the insert member and the housing in such a relation to have the hole of the former and the apertures of the latter coaligned, so that the cord-threading operation can be carried out quickly, easily and smoothly.

And, use of a spring of strong bias need not be sacrificed for facilitation of threading operation. The use of such a strong-bias spring enables the cord stopper to accomplish a satisfactory function of fastening the cord thereto for a prolonged period of time.

Obviously, the skilled person would realize that various modifications and variations of the present invention are possible in light of the above teaching. It is, therefore, to be understood that within the scope of the appended claims the invention may be practiced otherwise than as specifically described and that the invention is not limited to the embodiments described above in detail.

What is claimed is:

1. A cord stopper for releasably fastening a cord thereto, the cord stopper comprising: a housing having a longitudinal cavity extending longitudinally therein and a pair of through apertures formed transversely through the peripheral wall at opposed positions; an insert member fitted in the cavity so as to be reciprocally movable along the cavity and having a through hole transversely therethrough; biasing means for normally urging the insert member outward of the cavity wherein when the insert member is thrust into the cavity against the bias of the biasing means, the through hole comes substantially into alignment with the through apertures for insertion of the cord therethrough; and means for temporally locking the insert member to the housing with the through hole of the insert member substantially aligned with the through apertures of the housing wherein the housing has on the upper end an end plate which, in turn, has a coaxial orifice formed therethrough to communicate with the longitudinal cavity, the orifice having a pair of diametrically-opposed cutouts formed on the periphery thereof, the insert member being slightly less in diameter than the orifice, the locking means comprising a pair of elongated ridges provided axially on the peripheral wall of the insert member at respective diametrically-opposed positions, each elongated ridge terminating short of the upper end of the insert member, the insert member being inserted into the orifice into the cavity with the elongated ridges fitted through the cutouts whereupon the through hole of the insert member is slightly unaligned angularly with the through apertures of the housing wherein subsequent slight rotation of the insert member within the cavity brings the through hole into alignment with the through apertures.

2. A cord stopper for releasably fastening a cord thereto, the cord stopper comprising: a housing having a longitudinal cavity extending longitudinally therein and a pair of through apertures formed transversely through the peripheral wall at opposed positions; an insert member fitted in the cavity so as to be reciprocally movable along the cavity and having a through hole transversely therethrough; biasing means for normally urging the insert member outward of the cavity wherein when the insert member is thrust into the cavity against the bias of the biasing means, the through hole comes substantially into alignment with the through apertures for insertion of the cord therethrough; and means for temporally locking the insert member to the housing with the through hole of the insert member substantially aligned with the through apertures of the housing wherein the housing has a through slit formed through the peripheral wall, the through slit comprising a vertical slit part extending longitudinally of the housing and a horizontal slit part joined normal thereto, the locking means comprising a locking prong formed protuberantly on the peripheral wall of the insert member for guiding engagement with the through slit, the position and the length of the slit being such that, when the protuberant locking prong descends along the vertical slit part and reaches the horizontal slit part, the through hole reaches the level of the through apertures of the housing; and when the protuberant locking prong reaches the distal end of the horizontal slit part, the through hole comes into alignment with the through apertures.

3. A cord stopper for releasably fastening a cord thereto, the cord stopper comprising: a housing having a longitudinal cavity extending longitudinally therein and a pair of through apertures formed transversely through the peripheral wall at opposed positions; an insert member fitted in the cavity so as to be reciprocally movable along the cavity and having a through hole transversely therethrough; biasing means for normally urging the insert member outward of the cavity wherein when the insert member is thrust into the cavity against the bias of the biasing means, the through hole comes substantially into alignment with the through apertures for insertion of the cord therethrough; and means for temporally locking the insert member to the housing with the through hole of the insert member substantially aligned with the through apertures of the housing wherein the housing has a locking hole formed in the peripheral wall thereof, the insert member having a blind bore formed transversely therein, the locking means comprising a protuberant lug and another bias means fitted in the blind bore for normally urging the protuberant lug against the inner periphery of the cavity, the position of the blind bore and the locking hole are such that, when the protuberant lug comes into engagement with the locking hole under the bias of said another bias means, the through hole comes substantially into alignment with the through apertures.

* * * * *